United States Patent [19]

Gain et al.

[11] Patent Number: 4,902,029

[45] Date of Patent: Feb. 20, 1990

[54] WHEELCHAIR WITH LUGGAGE CARRIER

[75] Inventors: Jerome G. Gain, Islington; Brian McLuckie, Brampton; Gerhard R. Giehler, Orangeville, all of Canada

[73] Assignee: Wheel Assist Limited, Brampton, Canada

[21] Appl. No.: 231,350

[22] Filed: Aug. 11, 1988

[51] Int. Cl.[4] ............ B62B 3/12

[52] U.S. Cl. ............ 280/304.1; 280/250.1; 280/47.35; 280/33.991; 297/DIG. 4

[58] Field of Search ............ 280/242 WC, 289 WC, 280/289 R, 33.99 R, 33.99 A, 33.99 C, 47.35, 47.38; 297/DIG. 4

[56] References Cited

U.S. PATENT DOCUMENTS

| | | | |
|---|---|---|---|
| 2,612,209 | 9/1952 | Alldredge | 188/2 F |
| 3,497,234 | 2/1970 | Schray | 280/33.99 B |
| 3,704,025 | 11/1972 | Cerveny et al. | 280/41 A |
| 4,268,054 | 5/1981 | Twitchell et al. | 188/2 F |
| 4,350,227 | 9/1982 | Knoche | 188/2 F |
| 4,381,870 | 5/1983 | Mueller | 280/47.35 |
| 4,506,901 | 3/1985 | Tosti | 280/242 WC |
| 4,555,124 | 11/1985 | Millington | 280/289 WC |
| 4,749,064 | 6/1988 | Jinno et al. | 188/2 F |

*Primary Examiner*—Charles A. Marmor
*Assistant Examiner*—Donn McGiehan
*Attorney, Agent, or Firm*—G. A. Rolston

[57] ABSTRACT

A wheelchair and carrier for a disabled person having a seat and back, and wheels, a carrier integrally formed with the wheelchair extending rearwardly at the back of the seat and back, support wheels on the carrier for supporting the weight of items on the carrier, and, handles associated with the carrier so that a person can push the wheelchair and carrier as a single unit.

5 Claims, 3 Drawing Sheets

WHEELCHAIR WITH LUGGAGE CARRIER

The invention relates to a wheelchair with a luggage carrier typically, but not exclusively, for use in transport terminals, institutions, and the like.

BACKGROUND OF THE INVENTION

Handicapped and disabled persons are of necessity restricted to the use of wheelchairs for movement from place to place. However such persons frequently wish to travel, for example, or may be requird to be moved in or out of an institution such as a hospital, nursing home, or the like. In these circumstances the disabled person will necessarily have luggage which must also be carried. For example, in airport terminals, a disabled person must be wheeled into the terminal and onto the aircraft, in a wheelchair. The luggage of that person must be handled separately and checked in. On arrival at the destination the person must be wheeled from the aircraft and the luggage must then be collected from the luggage bay, and both luggage and the disabled person in the wheelchair must then be passed through Customs and Immigration.

Airports usually provide sufficient wheelchairs for moving such persons on to and off aircraft. However, the operation of such a wheelchair requires an attendant or ground crew person. The carrying of the luggage into the terminal, for checking in and out of the luggage bay and through Customs and Immigration for checking out, usually requires a second attendant or ground crew.

Since such attendants are already overworked, it clearly places an extra burden on the airport staff to provide two such attendants for each disabled person.

The present invention solves the problem by providing a wheelchair with facilities for carrying luggage for the person carried in the wheelchair. In this way, a single attendant could wheel the wheelchair together with the luggage into and out of the airport.

BRIEF SUMMARY OF THE INVENTION

With a view to overcoming these various problems noted above, the invention comprises a wheelchair for a disabled person, having a seat and back, and wheels for supporting the same, and having integrally formed therewith a carrier portion extending rearwardly at the back of the wheelchair, support wheels on said carrier portion for supporting the weight of items on said carrier portion, and handle means associated with said carrier portion whereby a person can push both the wheelchair and the carrier portion as a single unit.

More particularly, it is an objective of the invention to provide a wheelchair having the foregoing advantages, wherein said carrier portion is so constructed, as to permit a portion of a wheelchair from another such unit to be nested therein for storage.

More particularly, it is an objective of the invention to provide a wheelchair having the foregoing advantages wherein the carrier portion defines a support platform means, and recesses in said support platform means, for receiving the wheels of a further wheelchair nested therewith.

More particularly, it is an objective of the invention to provide a wheelchair having the foregoing advantages including side bars attached to the opposite sides of said wheelchair, and extending rearwardly therefrom, bend portions in said side bars, whereby the same are flared apart from one another, and rearward extensions of said side bars extending along either side of said platform means, and said handle means being attached thereto.

More particularly, it is an objective of the invention to provide a wheelchair having the foregoing advantages including brake means movable into and out of braking engagement with said wheel means on said wheelchair.

More particularly, it is an objective of the invention to provide a wheelchair having the foregoing advantages including foot support means on said wheelchair for supporting the feet of an occupant, said foot support means being movable between a lower entering position, and an upper support position.

More particularly, it is an objective of the invention to provide a wheelchair having the foregoing advantages including operating means for operating said foot support means and said brake means, between their two positions.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matters in which there are illustrated and described preferred embodiments of the invention.

IN THE DRAWINGS

DESCRIPTION OF A SPECIFIC EMBODIMENT

Figure 1:
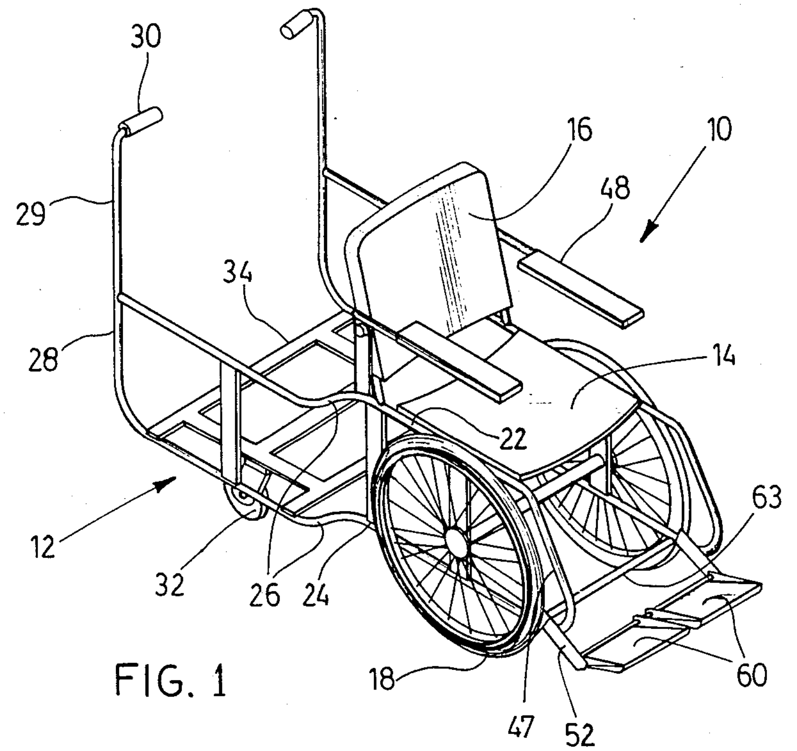
FIG. 1 is a perspective illustration of a wheelchair with a carrier means in accordance with the invention.

Referring first of all to FIG. 1, it will be seen that the invention is there illustrated in the form of a wheelchair provided with an integral carrier means for luggage and the like which is particularly, but not exclusively, suitable for use in transportation terminals such as airports and the like.

It will be appreciated that the invention is not restricted solely to use in a transportation terminal, but comprehends uses in other fields such as in institutional care, and elsewhere where persons confined to a wheelchair must be moved around together with goods such as luggage or the like.

As illustrated in FIG. 1, the chair portion is shown as 10, and the carrier frame portion is shown indicated generally as 12, although as will become apparent, they are simply two portions of an integral wheelchair structure.

The chair portion 10 has a seat 14, and a back 16, supported on two wheels 18—18 spaced apart on opposite sides.

It will be noted that whereas conventional wheelchairs are provided with two smaller rear wheels, to provide a four-wheel stable support, the present chair portion does not have the two rear wheels of a conventional wheelchair, which would normally be located more or less beneath the back portion 16.

In the present invention, the carrier portion 12 comprises upper and lower side bars 22 and 24, to which are attached to the seat, back, and wheels of of the chair portion 10. The upper and lower side bars are provided with bend portions 26 (FIG. 3) by means of whic they are flared outwardly. The upper and lower side bars extend rearwardly of the bend portions 26, in a more or less parallel configuration and define a carrier space for reception of baggage and the like.

An upright rear frame portion 28 extends from the lower side bar 24 to the upper side bar 22, and terminate in generally upright extension 29. Handles 30—30 are attached to extensions 29.

Load supporting caster wheels 32—32 are provided beneath the carrier portion 12.

Figure 3:
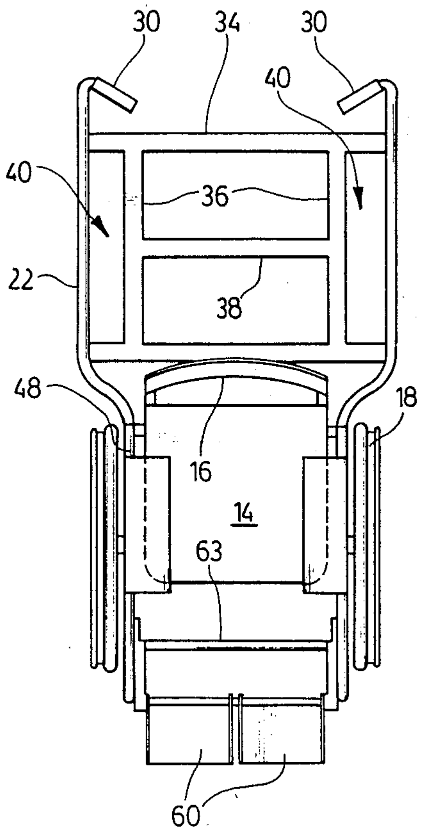
FIG. 3 is a top plan view of the wheelchair of FIG. 1.

As best seen in FIG. 3, a load supporting platform frame means is provided, comprising the parallel main transverse load bars 34—34, and the H-shaped intermediate load bars 36—36 and 38.

The bars 36—36 carry the castor wheels 32 and define, for purposes to be described below, two elongated parallel spaced-apart rectangular spaces 40—40, between bars 36—36 and bars 24—24.

Upright frame members 42, 44, and 46 are provided between upper and lower side bars 22 and 24, for maintaining the same in spaced-apart location, and providing integrity to the frame structure.

Bars 42 and 44 also assist in retaining items stored on the load bars 34, 36, and 38.

A forward generally angled chair frame bar 47 extnds upwardly from lower support bar 24, and connects in a smooth curve with the forward end of upper support bar 22.

Arm rests 48 are provided on either side of the seat. Rests 48 are swingably mounted on posts 50 extending vertically upwardly from upper side bar 22.

Figure 4:
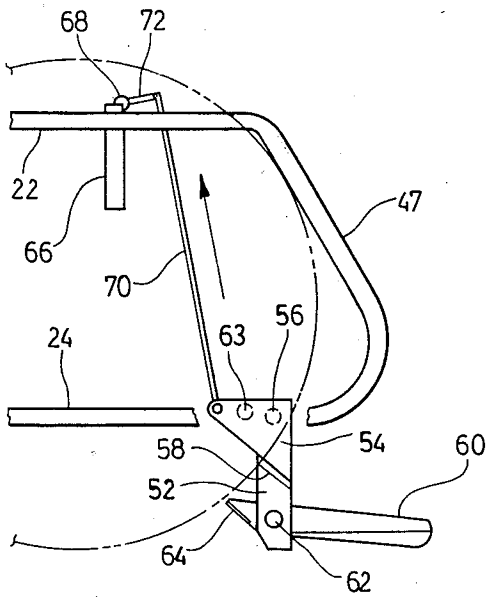
FIG. 4 is a side elevational view of the brake means and foot support means, in an entering position.
Figure 5:
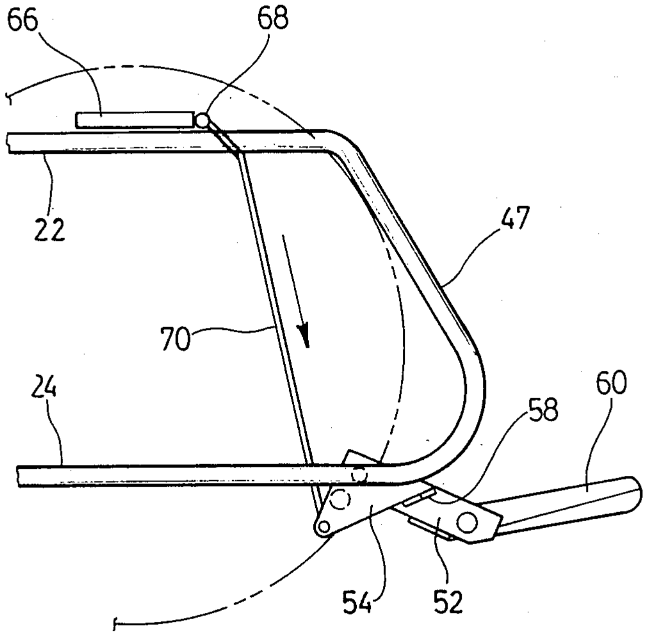
FIG. 5 is a side elevational view corresponding to FIG. 4, showing the brake means and foot support means in a movement position; and, FIG. 6 is a front elevational view of a portion of the operating means for the brake and foot support.
Figure 6:
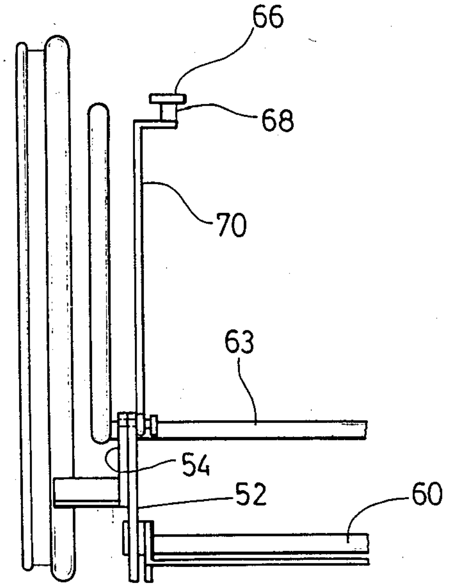

In order to provide a movable foot support for the feet of the occupant of the chair and, at the same time, to provide a braking function for the chair, for loading and unloading, mechanism is provided as shown in FIGS. 4, 5 and 6.

It will, of course, be appreciated that the foot support mechanism to be described could be provided independently with braking mechanism, and the braking mechanism could be provided independently of the foot support mechanism. However, for the sake of convenience and economy, in the present invention, the two functions are provided in association with one another, but it will be appreciated that this is not to be regarded as a limitation or restriction on the scope of the invention.

Thus, as shown in FIGS. 4, 5 and 6, the braking and foot support mechanism comprises two swingable braking bars 52, one on either side of the chair, provided at their upper ends with generally triangular pivot plates 54, pivoted as at 56 to the lower support bars 24. Angled brake plates 58 are attached to the lower extremity of pivot plate 54, making an angle to the longitudinal axis of bars 52.

On the lower end of swingable bars 52, there is swingably mounted a pair of foot support plates 60, one on either side of the chair, pivoted to bars 52 as at 62.

A cross-shaft 63 extends transversely between plates 54—54 to cause them to move in unison.

On the rearward ends of foot support plate 60, there are provided abutment members 64 adapted to abut against bars 52 (FIG. 5).

It will thus be apparent that when the foot support plates 60 and the bars 62 are in their lower position as shown in FIG. 4, the braking plates 58 will abut against the wheel 18 and prevent its rotation.

When the foot support plates 60 and the bars 52 are in their raised position as shown in FIG. 5, then the brake plates 58 are clear of the wheels 18 and the wheels can rotate.

It will also be apparent that when in the raised position the foot support plates 60 will raise and support the feet of the occupant of the chair clear of the ground.

Preferably, the braking bars 52 and foot support plates 60 are operated simultaneously by a self-contained mechanism on the chair itself.

In this preferred embodiment of the invention, the operating mechanism comprises a lever arm 66 pivotally mounted as at 68 on one of the upper support bars 22, adjacent seat 14.

Operating linkage 70 connects between one of plates 54—54, and a crank members 72 (FIG. 4) extending from lever arm 66.

It will thus be seen that as in FIG. 4, when the lever arm is in its lowered position, the linkage 70 will be drawn upwardly, thereby swinging the plates 54 and the arms 52 downwardly. The brake plates 58 will thus be applied to the wheels 18 and the foot plate 60 will thus be resting on the ground ready for entering, or leaving the chair.

When the lever arm 66 is swung upwardly, then the links 70—70 are moved downwardly, and the plates 54 and the bars 52 are swung upwardly and forwardly releasing the wheels. The foot support plates 60 are simultaneously raised upwardly off the ground thereby raising the feet of the occupant of the chair.

In operation, loading and unloading of the chair is greatly facilitated. One of arm rests 48 is swung upwardly, and the occupant can be moved sideways onto an off seat 14. The occupant of the chair can place his feet on the plates 60 as they are resting on the ground. At the same time, the chair is held against rolling away, while the luggage is loaded.

Once the lever arm 66 is swung upwardly the the feet are raised off the ground by the plates 60, and at the same time, the braking is released, and the chair can be moved.

This greatly facilitates the loading of items such as luggage on the bars 34, 36 and 38.

It will also be seen that the weight of the luggage or other items is supported on the castor wheels 32.

When the wheelchairs are not in use, then they may be partially nested. The chair portion of one wheelchair will enter the carrier portion of the next adjacent wheelchair, and the wheels 18 of the rearward wheelchair will fit into the recesses 40—40 of the carrier portion of the next forward chair.

Figure 2:
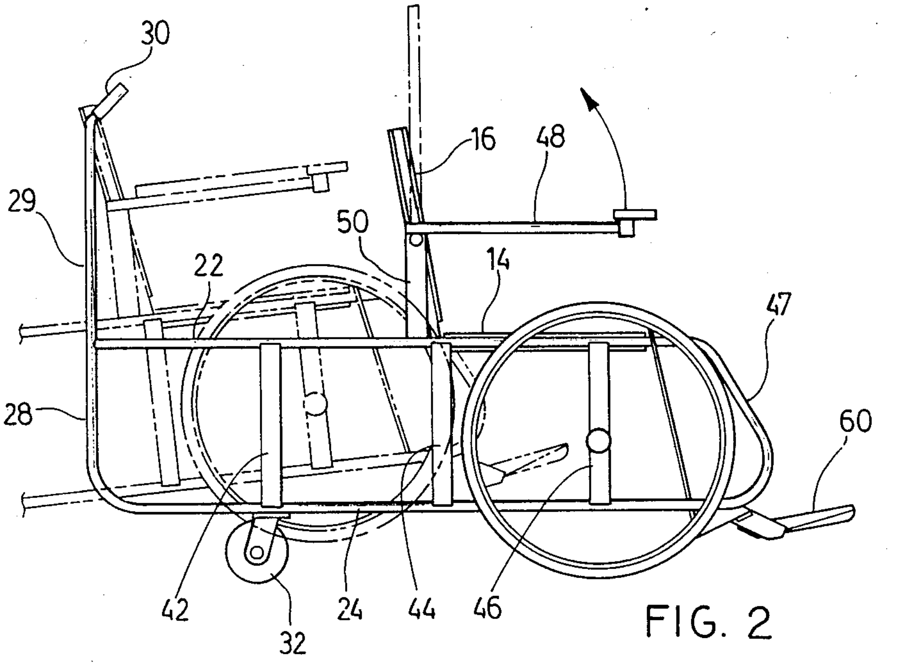
FIG. 2 is a side elevational view of the wheelchair of FIG. 1.

In this way, the chairs as shown in phantom in FIG. 2, can be moved forwardly or rearwardly as a single integral column of chairs, by a single attendant and occupy less space when not in use.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A wheelchair and carrier for a disabled person comprising:

a wheelchair portion having a seat and back, and wheels for supporting the same said wheels being spaced apart at predetermined first distance;

a carrier portion integrally formed therewith extending rearwardly at the back of said seat and back having side bar means defining a carrier space, and spaced apart a predetermined distance greater than said first distance;

support wheels on said carrier portion for supporting the weight of items on said carrier portion;

a support platform means on said carrier portion;

recesses in said support platform means defined by spaced apart bars, said recesses being spaced apart on opposite sides of said platform means, for receiving the wheels of a further wheelchair portion nested therewith, and, handle means associated with said carrier portion whereby a person can push said wheelchair portion and carrier as a single unit.

2. A wheelchair and carrier as claimed in claim 1 including side bars attached to the opposite sides of said wheelchair portion, and extending rearwardly therefrom, bend portions in said side bars adjacent said back of said wheelchair portion, whereby the same are flared apart from one another, and rearward extensions of said side bars extending along either side of said platform means, and said handle means being attached thereto.

3. A wheelchair and carrier as claimed in claim 1 including brake means movable into and out of braking engagement with said wheels on said wheelchair portion.

4. A wheelchair and carrier as claimed in claim 3 including foot support means on said wheelchair portion for supporting the feet of an occupant, said foot support means being movable between a lower entering position, and an upper support position.

5. A wheelchair and carrier as claimed in claim 4 including operating means for operating said foot support means and said brake means, between their two positions.

* * * * *